United States Patent
Lai

(10) Patent No.: US 9,637,192 B2
(45) Date of Patent: May 2, 2017

(54) HEIGHT ADJUSTMENT DEVICE FOR BICYCLE SADDLE

(71) Applicant: Shang-Hua Lai, Taichung (TW)

(72) Inventor: Shang-Hua Lai, Taichung (TW)

( * ) Notice: Subject to any disclaimer, the term of this patent is extended or adjusted under 35 U.S.C. 154(b) by 88 days.

(21) Appl. No.: 14/874,469

(22) Filed: Oct. 4, 2015

(65) Prior Publication Data

US 2017/0096186 A1    Apr. 6, 2017

(51) Int. Cl.
*B62J 1/08*    (2006.01)

(52) U.S. Cl.
CPC ............ *B62J 1/08* (2013.01); *B62J 2001/085* (2013.01)

(58) Field of Classification Search
CPC .............................. B62J 1/08; B62J 2001/085
USPC ........................................ 91/459; 297/215.13
See application file for complete search history.

(56) References Cited

U.S. PATENT DOCUMENTS

| 7,721,640 | B2 * | 5/2010 | Lee | ........................... | A47C 3/30 |
| | | | | | 297/344.19 |
| 8,308,124 | B2 * | 11/2012 | Hsu | ........................... | B62J 1/08 |
| | | | | | 248/161 |
| 8,641,073 | B2 * | 2/2014 | Lee | ........................... | B62J 1/08 |
| | | | | | 280/288.4 |
| 9,511,809 | B2 * | 12/2016 | Kodama | ................... | B62J 1/08 |

* cited by examiner

*Primary Examiner* — Thomas E Lazo

(57) ABSTRACT

A height adjustment device for a bicycle saddle is provided and essentially includes a hydraulic cylinder, an adjustment disk, and a driving mechanism. An annular guiding groove is disposed on the adjustment disk and has a bottom whose height decreases from one end of the annular guiding groove to the other end of the annular guiding groove. When the adjustment disk is being driven by a motor, the annular guiding groove enables a relief valve of the hydraulic cylinder to turn on and turn off according to the level of the accumulated pressure, so as to fine-tune saddle height.

3 Claims, 3 Drawing Sheets

HEIGHT ADJUSTMENT DEVICE FOR BICYCLE SADDLE

BACKGROUND OF THE INVENTION

1. Technical Field

The present invention relates to a ride height adjustment device for a bicycle saddle and more particularly to a height adjustment device for a bicycle saddle.

2. Description of Related Art

In addition to a means of transportation, the purposes of bicycles nowadays come in two categories: leisure and race. Leisure-oriented bicycles have lenient requirements of saddle height, as they only require that saddle height can be adjusted easily and quickly before a ride and that the saddle can be quickly and precisely positioned after the adjustment of saddle height. Race-oriented bicycles require that saddle height can be fine-tuned during a race; for example, when racing uphill, cyclists have to ensure that the tread angles of their legs, thighs, and arms must match the distance between the saddle and each pedal, so as to render the tread smooth and easy. In short, race-oriented bicycles must be lightweight, effective in changing speed, and capable of fine-tuning saddle height during a ride.

Referring to FIG. 1, there is shown a schematic view of a conventional height adjustment device for a bicycle saddle. The height adjustment device comprises a hydraulic cylinder 10, a vertical post 11, a cylinder shaft 12, a support 13, a saddle 14, an adjustment rod 15, a pin 16 and a relief valve 17. The end of the hydraulic cylinder 10 is coupled to the bottom of the vertical post 11 from inside. The cylinder shaft 12 of the hydraulic cylinder 10 extends upward to protrude from the top of the vertical post 11. The cylinder shaft 12 is coupled to the support 13 from outside the vertical post 11. The saddle 14 is disposed on the support 13. The adjustment rod 15 is pivotally coupled to the support 13 by a pin 16. The front end of the adjustment rod 15 abuts against a relief valve 17 of the cylinder shaft 12. The adjustment rod 15 can be operated and swung about the pin 16 which functions as the fulcrum. The front end of the adjustment rod 15 presses and drives a hydraulic valve 17 to descend, so as to start a cycle of releasing the pressure accumulated inside the hydraulic cylinder 10. When the vertical post 11 is mounted on a triangular frame of the bicycle, the cylinder shaft 12 bears the rider's body weight, such that hydraulic pressure is accumulated inside the hydraulic cylinder 10 (to therefore decrease saddle height,) whereas the relief valve 17 is pressed and driven downward by the adjustment rod 15 to thereby start the cycle of releasing the pressure accumulated inside the hydraulic cylinder 10, thus driving the cylinder shaft 12 to extend upward (to therefore increase saddle height.) As described above, the hydraulic cylinder 10 bears the rider's body weight to thereby effectuate accumulation of pressure. The rider rotates the adjustment rod 15 to start the cycle of releasing the pressure accumulated inside the hydraulic cylinder 10, such that saddle height can be fine-tuned to a limited extent during the ride. However, in practice, during a race, it is risky for the rider to free a hand which is otherwise gripping the handlebar for balancing and steering the bicycle and use the hand to rotate the adjustment rod 15 in attempt to adjust saddle height. In view of this, the prior art discloses connecting an adjustment cord between the adjustment rod 15 and the handlebar such that, during a ride, the rider may pull the adjustment cord from the handlebar to rotate the adjustment rod 15 and thereby operate the hydraulic cylinder 10 for adjusting saddle height. However, the adjustment cord is long and thus tends to entangle itself with the triangular frame; as a result, the adjustment cord is inept and predisposed to failures. According, the present invention aims to overcome the aforesaid drawbacks of the prior art.

BRIEF SUMMARY OF THE INVENTION

It is an objective of the present invention to provide a height adjustment device for a bicycle saddle. The height adjustment device essentially comprises a hydraulic cylinder, an adjustment disk, and a driving mechanism. The height of the bottom of an annular guiding groove disposed on the adjustment disk decreases gradually from one end of the annular guiding groove to the other end of the annular guiding groove. When the adjustment disk is being driven by a motor, the annular guiding groove of the adjustment disk enables a relief valve of the hydraulic cylinder to turn on and turn off according to the level of the accumulated pressure, so as to fine-tune saddle height.

Another objective of the present invention is to provide a height adjustment device for a bicycle saddle. The height adjustment device is characterized in that the start of the motor is remote-controlled wirelessly to thereby enhance ease of use.

Yet another objective of the present invention is to provide a height adjustment device for a bicycle saddle. The height adjustment device is characterized in that the motor operates in conjunction with a sensor whereby saddle height is fine-tuned precisely.

In order to achieve the above and other objectives, the present invention provides a height adjustment device for a bicycle saddle. The height adjustment device comprises a hydraulic cylinder, a vertical post, a support, and a driving mechanism.

The hydraulic cylinder has a cylinder shaft which extends into the vertical post to effectuate engagement, and an end of the hydraulic cylinder extends upward to protrude from the top of the vertical post so as to be coupled to the support, thereby allowing a saddle to be disposed on the support.

The driving mechanism comprises an electric motor, a deceleration gear train, a sensor, an adjustment disk, a signal receiver, and a battery.

The electric motor is connected integrally to the adjustment disk through the deceleration gear train. The sensor is disposed between the deceleration gear train and the adjustment disk. The sensing rod is disposed below the adjustment disk, such that the adjustment disk interacts with a sensing recess of the sensor through the sensing rod, so as to identify a rotation idle and a rotation start of the adjustment disk.

Regarding the height adjustment device for a bicycle saddle, a relief valve of the cylinder shaft of the hydraulic cylinder abuts against an annular guiding groove of the adjustment disk from inside, such that the adjustment disk rotates from a highest bottom of the annular guiding groove gradually to a lowest bottom of the annular guiding groove, thereby releasing accumulated pressure and driving accumulated pressure of the relief valve of the hydraulic cylinder.

Regarding the height adjustment device for a bicycle saddle, the electric motor starts and idles by signals received by the signal receiver.

Compared with the prior art, the present invention has the following advantages: a signal receiver, a battery, and an antenna are disposed at the bottom of an electric motor; a signal transmitter is mounted on a handlebar to function as a fine-tuning device; the vertical post is mounted on a triangular frame of the bicycle; the rider operates the signal transmitter mounted on the handlebar; and saddle height is fine-tuned precisely with the signal receiver and a driving mechanism.

DETAILED DESCRIPTION OF THE INVENTION

Figure 1:
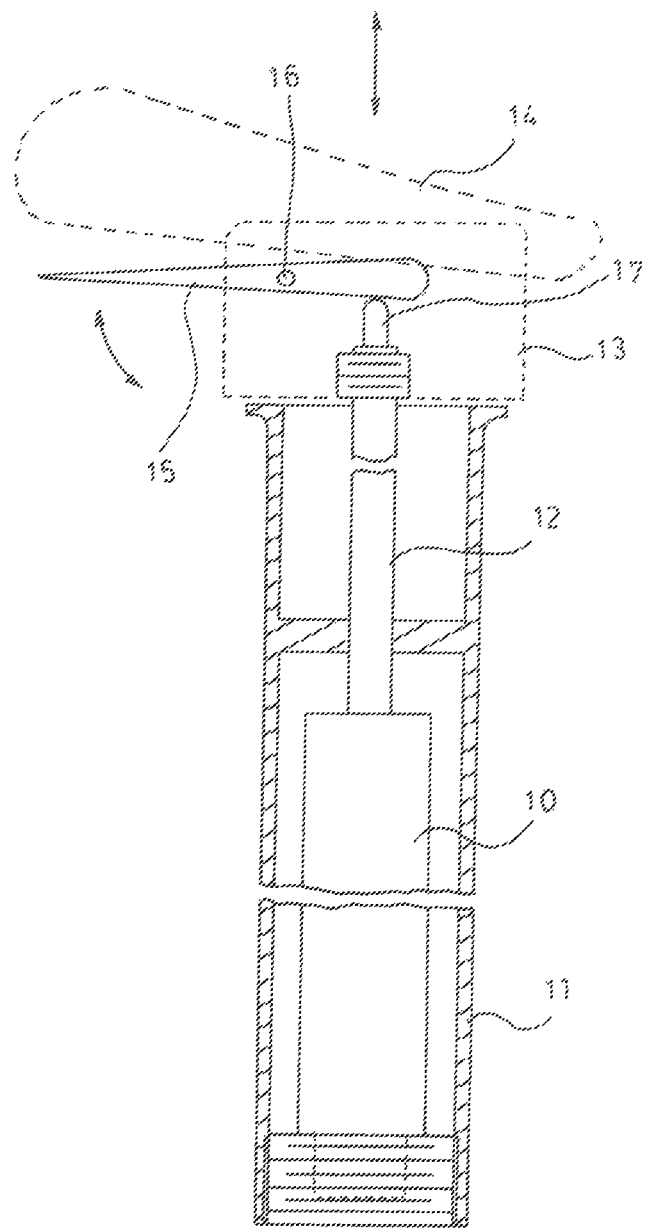
FIG. 1 (PRIOR ART) is a schematic view of a conventional height adjustment device for a bicycle saddle.
Figure 2:
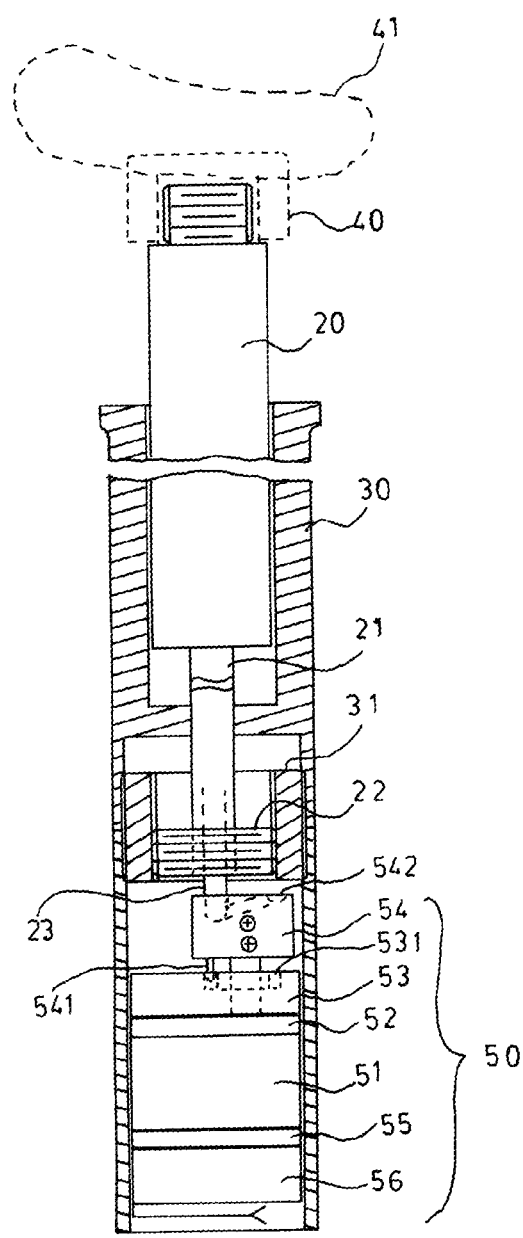
FIG. 2 is a schematic view of a height adjustment device for use with a bicycle saddle (to decrease saddle height) according to the present invention.
Figure 3:
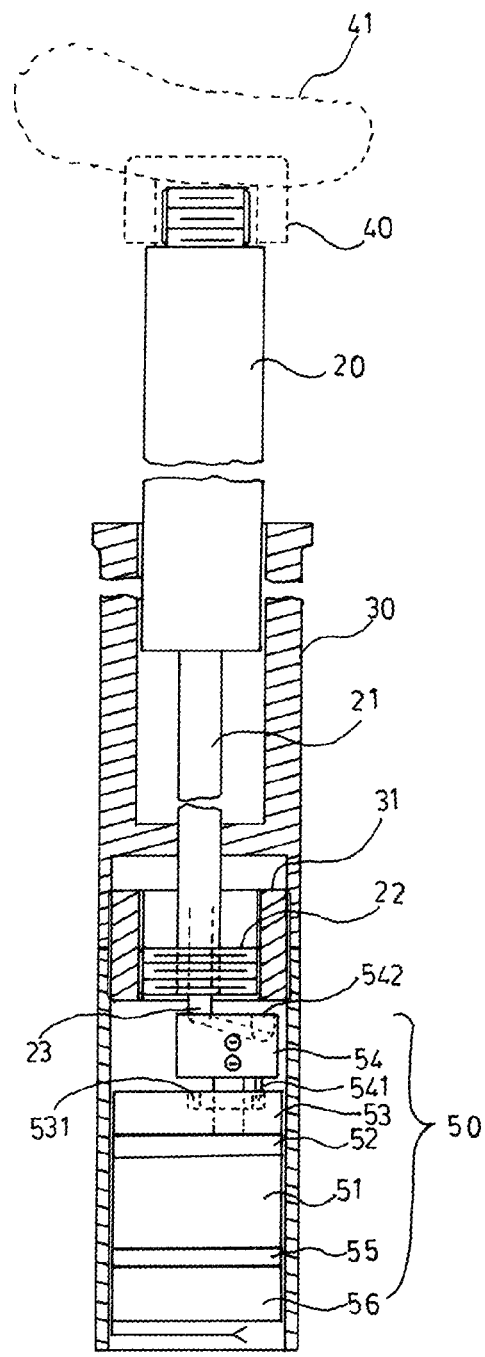
FIG. 3 is a schematic view of the height adjustment device for use with a bicycle saddle (to increase saddle height) according to the present invention.
Figure 4:
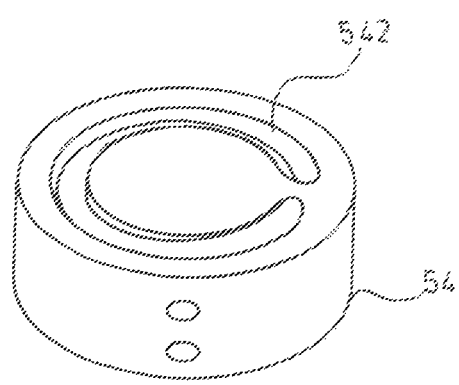
FIG. 4 is a perspective view of an adjustment disk according to the present invention.

Referring to FIG. 2, FIG. 3, FIG. 4, the present invention provides a height adjustment device for a bicycle saddle. The height adjustment device essentially comprises a hydraulic cylinder 20, a vertical post 30, a support 40, and a driving mechanism 50.

The hydraulic cylinder 20 has a cylinder shaft 21 which extends into the vertical post 30. A fixing unit 22 disposed at the front end of the cylinder shaft 21 is engaged with a connecting unit 31 disposed in the vertical post 30, such that the end of the hydraulic cylinder 20 extends upward to protrude from the top of the vertical post 30. The end of the hydraulic cylinder 20 is coupled to a support 40. A saddle 41 is firmly disposed on the support 40.

The driving mechanism 50 comprises an electric motor 51, a deceleration gear train 52, a sensor 53, an adjustment disk 54, a signal receiver 55, and a battery 56. The electric motor 51 is connected integrally to the adjustment disk 54 through the deceleration gear train 52. The sensor 53 is disposed between the deceleration gear train 52 and the adjustment disk 54. A sensing rod 541 disposed below the adjustment disk 54 is disposed in a sensing recess 531 disposed on the sensor 53, so as to effectuate the fine-tuning of the idle and start of rotation of the adjustment disk 54. Referring to FIG. 4, an annular guiding groove 542 is disposed on the top surface of the adjustment disk 54. The bottom of the annular guiding groove 542 is of a height which decreases gradually from one end of the annular guiding groove 542 to the other end of the annular guiding groove 542. The cylinder shaft 21 of the hydraulic cylinder 20 has a relief valve 23. The relief valve 23 abuts against an annular guiding groove 542 of the adjustment disk 54 from inside so as to be subjected to a pressing force. Referring to FIG. 2, when the driving mechanism 50 receives an instruction from the signal receiver 55 to cause the electric motor 51 to start, the deceleration gear train 52 drives the adjustment disk 54 to rotate to the lowest bottom of the annular guiding groove 542 and thus abut against the relief valve 23 of the hydraulic cylinder 20 to therefore release the pressure otherwise accumulated in the hydraulic cylinder 20, such that the cylinder shaft 21 retreats into the hydraulic cylinder 20 to thereby effectuate the fine-tuning of the descent of the saddle 41. Referring to FIG. 3, when the driving mechanism 50 receives an instruction from the signal receiver 55 to cause the electric motor 51 to start, the deceleration gear train 52 drives the adjustment disk 54 to rotate to the highest bottom of the annular guiding groove 542 and thus abut against the relief valve 23 of the hydraulic cylinder 20 to therefore release the pressure otherwise accumulated in the hydraulic cylinder 20, such that the cylinder shaft 21 extends to thereby effectuate the fine-tuning of the ascent of the saddle 41. Referring to the schematic views of FIG. 2 and FIG. 3, the bottom of the annular guiding groove 542 of the adjustment disk 54 is of a height which decreases gradually from one end of the annular guiding groove 542 to the other end of the annular guiding groove 542; hence, the level of the pressure accumulated in connection with a hydraulic valve can be fine-tuned through the interaction between the sensing rod 541 disposed below the adjustment disk 54 and the sensing recess 531 of the sensor 53. In short, the height adjustment device of the present invention is capable of the precise continuous fine-tuning of saddle height and features ease of use.

The above description is illustrative rather than restrictive of the present invention. Persons skilled in the art understand that plenty of equivalent amendments or variations may be made to the present invention without departing from the spirit and scope of the claims of the present invention and still fall within the scope of the claims of the present invention.

What is claimed is:

1. A height adjustment device for a bicycle saddle, the height adjustment device comprising a hydraulic cylinder, a vertical post, a support, and a driving mechanism,
    wherein the hydraulic cylinder has a cylinder shaft which extends into the vertical post to effectuate engagement, and an end of the hydraulic cylinder extends upward to protrude from a top of the vertical post so as to be coupled to the support, thereby allowing a saddle to be disposed on the support;
    wherein the driving mechanism comprises an electric motor, a deceleration gear train, a sensor, an adjustment disk, a signal receiver, and a battery;
    wherein the electric motor is connected integrally to the adjustment disk through the deceleration gear train, with the sensor disposed between the deceleration gear train and the adjustment disk, wherein the sensing rod is disposed below the adjustment disk, such that the adjustment disk interacts with a sensing recess of the sensor through the sensing rod, so as to identify a rotation idle and a rotation start of the adjustment disk.

2. The height adjustment device of claim 1, characterized in that: a relief valve of the cylinder shaft of the hydraulic cylinder abuts against an annular guiding groove of the adjustment disk from inside, such that the adjustment disk rotates from a highest bottom of the annular guiding groove gradually to a lowest bottom of the annular guiding groove, thereby releasing accumulated pressure and driving accumulated pressure of the relief valve of the hydraulic cylinder.

3. The height adjustment device of claim 1, characterized in that: the electric motor starts and idles by signals received by the signal receiver.

* * * * *